United States Patent [19]

Rausch

[11] Patent Number: 4,764,856
[45] Date of Patent: Aug. 16, 1988

[54] POWER-SUPPLY ARRANGEMENT

[75] Inventor: Frederik Rausch, Nijmegen, Netherlands

[73] Assignee: U.S. Philips Corporation, New York, N.Y.

[21] Appl. No.: 55,658

[22] Filed: May 28, 1987

[30] Foreign Application Priority Data

Jan. 23, 1987 [NL] Netherlands .................. 8700161

[51] Int. Cl.$^4$ .................................. H02M 3/335
[52] U.S. Cl. .................................. 363/21; 363/97; 323/285
[58] Field of Search ............... 363/20, 21, 97, 131; 323/285

[56] References Cited

U.S. PATENT DOCUMENTS 3,350,628  10/1967  Gallagher et al. ............ 323/285
4,376,263  3/1983   Pittroff et al. ............... 363/97 X
4,672,518  6/1987   Murdock ....................... 363/21

FOREIGN PATENT DOCUMENTS 0226772  11/1985  Japan ............................. 363/21

Primary Examiner—Patrick R. Salce
Assistant Examiner—Kristine Peckman
Attorney, Agent, or Firm—Thomas A. Briody; David R. Treacy; Bernard Franzblau

[57] ABSTRACT

A flyback converter comprises a series arrangement of a primary winding ($n_1$), a transistor switch ($S_1$) and a resistor ($R_1$) connected between two input terminals (1, 2) for receiving an input voltage. The series arrangement of a secondary winding ($n_2$) and a diode ($D_1$) is arranged between a pair of output terminals (3, 4) for connection to a load (M). The transistor switch ($S_1$) is controlled by pulses from a pulse-width modulator (10). A sawtooth voltage generated by an oscillator (20) is applied to a first input (11) of the pulse width modulator. A first feedback voltage is applied to a second input (12) of the modulator via a control amplifier (40). This feedback voltage is proportional to the difference between a reference voltage from a reference source (30) and a fraction of the output voltage. A second feedback voltage equal to the voltage across the resistor ($R_1$) is applied to said second input via a capacitor ($C_1$).

16 Claims, 3 Drawing Sheets

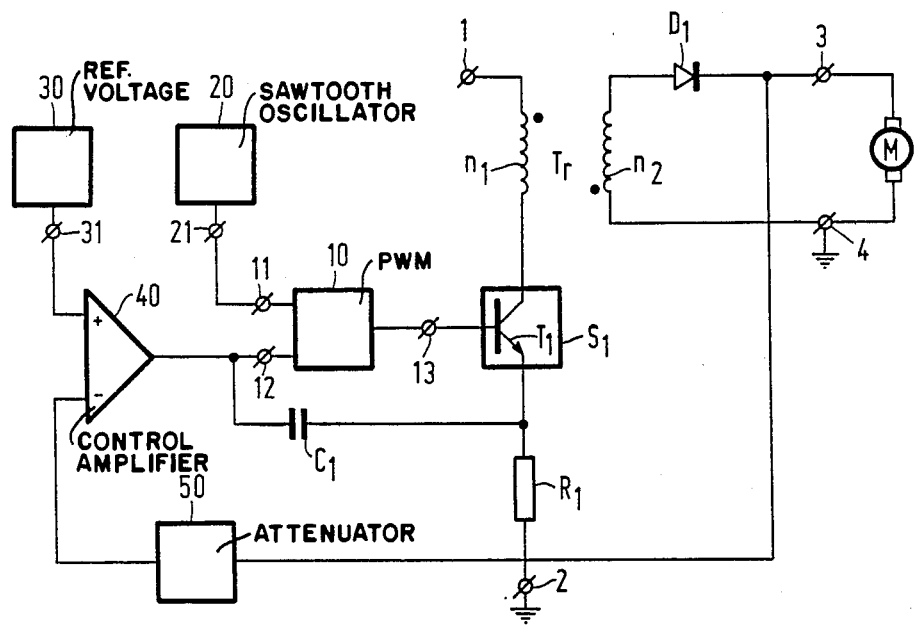
FIG.1
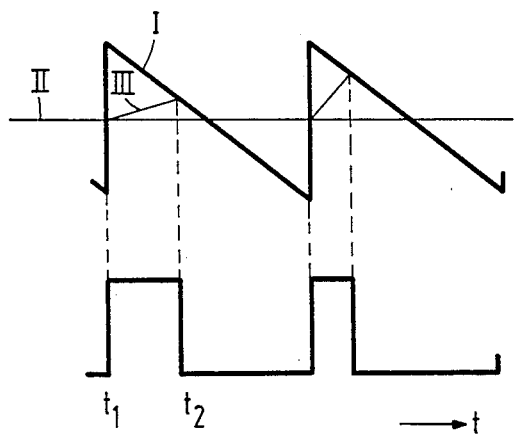
FIG.2a
FIG.2b

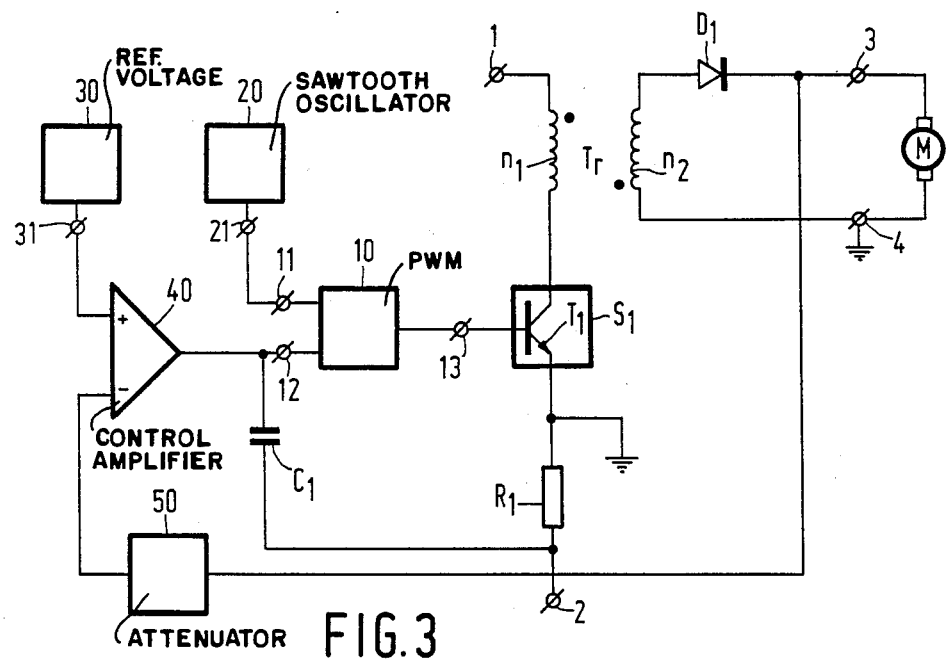
FIG.3
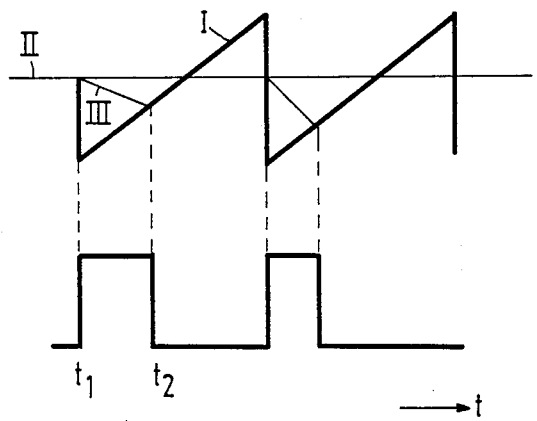
FIG.4a
FIG.4b

POWER-SUPPLY ARRANGEMENT

BACKGROUND OF THE INVENTION

This invention relates to a power-supply arrangement comprising
- a series arrangement of at least a primary winding of a transformer, a transistor switch and a first resistor connected between a first and a second input terminal for receiving an input voltage,
- the series arrangement of at least a secondary winding of the transformer and a diode connected between a first and a second output teminal for connecting a load,
- a pulse-width modulator for supplying control pulses to the transistor switch,
- an oscillator for supplying a sawtooth signal to a first input of the pulse-width modulator, and
- a control amplifier for supplying to a second input of the pulse-width modulator a first feedback signal which is a measure of the difference between a reference signal and a signal which is proportional to an output signal of the power-supply arrangement.

Such a power-supply arrangement is suitable for general purposes and is particularly suitable for use in a rechargeable shaver for charging the batteries and/or powering the motor.

Such a power-supply arrangement is known from the article "Steuer- und Regelschaltung TDA 1060 für Schaltnetzteile" in Technische Information für die Industrie, April 1977. In this known arrangement the output voltage of the arrangement is maintained substantially constant in that the difference between a reference voltage and a fraction of the output voltage is amplified and is fed back to a pulse-width modulator which compares this voltage with a sawtooth voltage to control the width of the control pulses for the transistor switch.

The output voltage of the power-supply arrangement depends on the input voltage. For a constant pulse width, when the input voltage increases, the maximum value of the current through the primary winding increases, so that the energy stored in the transformer also increases. In order to minimise variations of the output voltage as a result of input-voltage variations the arrangement employs a feed-forward control, i.e. a voltage proportional to the input voltage is applied to the oscillator in such a way that the rise time of the sawtooth voltage decreases as the input voltage increases. When the input voltage increases this results in a decreasing width of the control pulses for controlling the transistor switch. However, this control method has the drawback that allowance is only made for variations of the input voltage, which variations directly influence the width of the control pulses. Therefore, the output-voltage variations are still comparatively large so that the control range of the feedback loop must be comparatively large and, consequently, the components used therein must have a comparatively large bandwidth. Moreover, these comparatively large variations complicate stabilisation of the feedback loop. Therefore, it is an object of the invention to provide a power-supply arrangement whose output-signal variations are comparatively small.

SUMMARY OF THE INVENTION

According to the invention a power-supply arrangement of the type defined in the opening paragraph is characterized in that the power-supply arrangement comprises means for applying to the second input of the pulse-width modulator a second feedback signal which is a measure of the voltage across the first resistor. Applying the voltage across the first resistor to the second input of the pulse-width modulator provides direct compensation for the effects of input-voltage variations and other variations on the current through the primary winding and hence on the energy content of the transformer. This reduces the output-voltage variations of the power supply arrangement so that the circuit arrangement can have a smaller control range and can be constructed by means of components of comparatively small bandwidth. Furthermore, the first feedback loop can be stabilised more simply.

An embodiment of a power-supply arrangement in accordance with the invention may be characterized in that said means comprise a capacitor having a first terminal coupled to the second input of the pulse-width modulator and a second terminal coupled to one end of the first resistor. This embodiment has the advantage that, if for stabilising the first feedback loop a capacitor is connected to the output of the amplifier to integrate the output voltage of this amplifier, this capacitor may be combined with the capacitor for applying the second feedback signal.

This embodiment may be characterized further in that
- the oscillator is adapted to supply a negative-ramp sawtooth signal,
- the end of the first resistor which is connected to the second input terminal is connected to a point at ground potential, and
- the second terminal of the capacitor is coupled to that end of the first resistor which is not connected to the second input terminal.

Alternatively, this embodiment may be characterized further in that
- the oscillator is adapted to supply a positive-ramp sawtooth signal,
- the end of the first resistor which is not connected to the second input terminal is connected to a point at ground potential, and
- the second terminal of the capacitor is coupled to that end of the first resistor which is connected to the second input terminal.

In accordance with a further embodiment the power-supply arrangement in accordance with the invention may be characterized in that the load comprises a rechargeable battery and the output signal of the power-supply arrangement is a current for charging the battery, and in that a motor can be arranged in parallel with the load, the output signal of the power-supply arrangement in the parallel-connected condition being constituted by a voltage for energising the motor. In this case the power-supply arrangement may be characterized further in that the arrangement comprises
- a first control amplifier for supplying a feedback signal which is a measure of the difference between a reference signal and a signal which is proportional to the average charging current of the battery and which appears on the second input of the pulse width modulator if the load is constituted by the battery, and a second control amplifier for supplying a feed-back signal which is a measure of the difference between a reference signal and a signal which is proportional to the motor voltage and which appears on the second input of the pulse-width modulator if the load is constituted by the battery in parallel with the motor.

BRIEF DESCRIPTION OF THE DRAWING

Embodiments of the invention will now be described in more detail, by way of example, with reference to the accompanying drawings, in which:

FIG. 1 shows a first embodiment of a power-supply arrangement in accordance with the invention, FIGS. 2a and 2b show some voltage characteristics to illustrate the operation of the arrangement of FIG. 1, FIG. 3 shows a second embodiment of a power-supply arrangement in accordance with the invention, FIGS. 4a and 4b show some voltage characteristics to illustrate the operation of the arrangement shown in FIG. 3.

DESCRIPTION OF THE PREFERRED EMBODIMENTS

Figure 5:
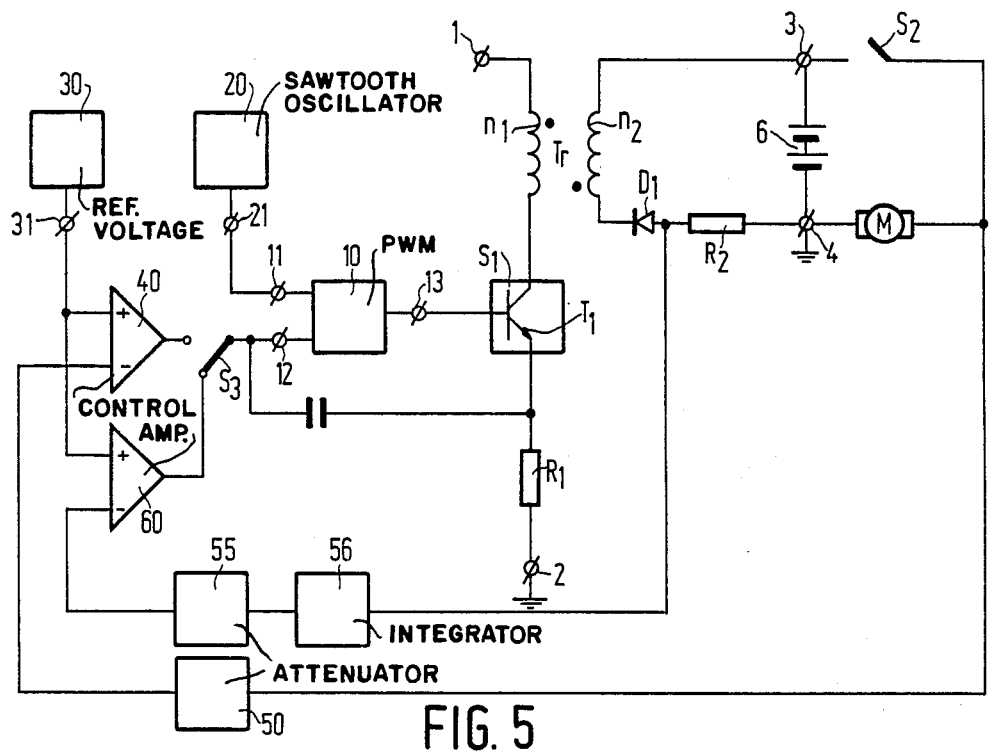
FIG. 5 shows a third embodiment of a power-supply arrangement in accordance with the invention.

FIG. 1 shows a first embodiment of a power-supply arrangement in accordance with the invention. The arrangement comprises two input terminals 1 and 2 for receiving an input voltage, which may be a direct voltage or a rectified alternating voltage. In the present embodiment the input terminal 2 is connected to ground. A series arrangement of the primary winding $n_1$ of a transformer, a transistor switch $S_1$, which in the present case is constituted by a transistor $T_1$, and a resistor $R_1$ is arranged between the input terminals 1 and 2. The secondary winding $n_2$ is arranged in series with a diode $D_1$ between two output terminals 3 and 4. The output terminal 4 is connected to ground. The diode $D_1$ is poled in such a way that the power-supply arrangement forms a flyback converter. Between the terminals 3 and 4 a load is arranged, which load in the present case is constituted by a motor. Of course other kinds of load may be coupled to terminals 3 and 4. The base of the transistor $T_1$ is coupled to the output 13 of a pulse-width modulator 10, which has a first input 11 connected to an output 21 of an oscillator 20 and a second input 12 coupled to the output of a control amplifier 40 and, via a capacitor $C_1$, to that end of the resistor $R_1$ which is not connected to the ground terminal 2. The non-inverting input of the control amplifier 40 is connected to the output 31 of a reference-voltage source 30 and the inverting input is connected to the output terminal 3 of the arrangement by an attenuator 50. The operation of the arrangement will be explained with reference to FIGS. 1 and 2. The output of the pulse-width modulator 10 delivers a control pulse by means of which the transistor $T_1$ is driven into conduction. The current through the primary winding $n_1$ and hence through the resistor $R_1$ increases as a linear function during the forward interval, the rise time being directly proportional to the input voltage applied between the terminals 1 and 2. When the transistor $T_1$ is turned off the polarity of the voltage across the secondary $n_2$ is reversed so that the diode $D_1$ is turned on. The energy which is stored in the transformer $T_r$ during the forward interval is delivered to the motor M in the form of a charging current in the flyback interval. This current decreases as a substantially linear function of time until the transistor $T_1$ is again turned on by a subsequent control pulse. Variations of the load constituted by the motor will also give rise to variations of the voltage across the motor. In order to maintain this voltage as constant as possible the width of the control pulses for controlling the transistor $T_1$ is controlled depending on the difference between a reference voltage and a voltage which is proportional to the voltage across the motor. For this purpose a fraction of the output voltage is applied to the inverting input of the control amplifier 40 by means of an attenuator 50, which may be for example a simple voltage divider, the gain of said amplifier being fixed at a specific required value. A reference voltage is applied to the non-inverting input of said control amplifier. The amplified difference between these two voltages is applied to the second input 12 of the pulse-width modulator as a first feedback voltage. This input 12 is connected to ground by the series arrangement of the capacitor $C_1$ and the resistor $R_1$. This series arrangement, together with the output impedance of the amplifier 40, or together with an impedance arranged in series with the output, constitutes a low-pass filter which removes high-frequency variations from the first feedback voltage. This improves the stability of the overall negative-feedback loop. The voltage appearing across the resistor $R_1$ during the forward interval is applied to the input 12 via the capacitor $C_1$ as a second feed-back voltage. In the pulse-width modulator 10 the sum of the first feedback voltage and the second feedback voltage is compared with the saw-tooth votage from the oscillator 20, which sawtooth voltage is applied to the first input 11 of the modulator. The sawtooth voltage has a negative ramp and varies as indicated by the reference numeral I in FIG. 2a. In this Figure the first feedback voltage bears the reference numeral II and the second feed-back voltage bears the reference numeral III. At the instant $t_1$ the sawtooth voltage I exceeds the first feedback voltage II and a pulse as shown in FIG. 2b appears at the output 13 of the pulsewidth modulator 10. This causes the transistor $T_1$ to be turned on. The resulting linearly increasing voltage across the resistor $R_1$ is added to the first feedback voltage via the capacitor $C_1$ to form the second feed-back voltage III. At the instant $t_2$ the sum of these voltages exceeds the sawtooth voltage and the transistor $T_1$ is turned off. The current through the primary winding $n_1$ is then substantially directly proportional to the input voltage applied to the input terminals 1 and 2, so that the voltage across the resistor $R_1$ is also substantially directly proportional to the input voltage. By applying this voltage to the input 12 of the pulse-width modulator 10, direct compensation is obtained for the effect of a varying input voltage on the primary current and hence on the energy content of the transformer by adapting the pulse width of the control pulses. The effect of a higher input voltage on the pulsewidth is illustrated in the second sawtooth waveform of FIG. 2a. This counteracts not only the effect of variations of the input voltage on the output voltage across the motor M, but also the influence of variations in the other components of the arrangement, such as variations in rise time of the sawtooth voltage of the oscillator 20 or variations in the gain of the control amplifier 40. The effects of these variations on the primary current and hence on the energy content of the transformer are compensated for directly by the second feed-back control in the forward interval without the variations first giving rise to variations in output voltage, which are not counteracted via the overall negative-feed-back loop until the subsequent forward intervals. As a result of this the output-voltage variations are substantially smaller than in the known arrangement. This enables the control range of the overall-feedback loop to be reduced so that the components used in this feedback loop, such as the control amplifier 40, may have a smaller bandwidth. Moreover, as the variations in the first-feedback voltage are smaller, the capacitor $C_1$ may have a smaller value. Since the variations in the maximum value of the primary current are smaller the transformer may also be dimensioned more tightly. This enables the arrangement to be constructed by means of simpler and hence cheaper components.

FIG. 3 shows a second embodiment of a power-supply arrangement in accordance with the invention in which identical parts bear the same reference numerals as in FIG. 1. In this embodiment that end of the resistor $R_1$ which is remote from the input terminal 2 is connected to ground. The capacitor $C_1$ is now connected to the terminal 2. In the present embodiment the oscillator 20 supplies a positive-ramp sawtooth voltage. The operation of the arrangement will be explained with reference to FIGS. 4a and 4b. In these Figures the sawtooth voltage bears the numeral I and the first feedback voltage, which is applied to the input 12 of the pulse-width modulator 10, bears the numeral II. At the beginning of a sawtooth a control pulse appears on the output 13 of the modulator 10, by means of which pulse the transistor $T_1$ is turned on. This results in an increasingly negative voltage III across the resistor $R_1$, which is added to the first feedback voltage II via the capacitor $C_1$. At the instant at which the voltage on the input 12 becomes smaller than the voltage on the input 11 the control pulse is terminated and the transistor $T_1$ is turned off. The rise time of the voltage across the resistor $R_1$ decreases as the input voltage increases, as a result of which the pulse width is reduced, as is illustrated for the second sawtooth in FIGS. 4a and 4b. Otherwise, the arrangement operates in the same way as that shown in FIG. 1.

FIG. 5 shows a third embodiment of an arrangement in accordance with the invention, identical parts bearing the same reference numerals as in FIG. 1. Between the output terminals 3 and 4 of the power-supply arrangement a battery 6 is connected. This battery 6 comprises, for example, two nickel-cadmium cells arranged in series. During the forward intervals the power-supply arrangement supplies the charging current to the battery, 6. In order to preclude damaging of the battery this charging current must have a specific constant average value. A resistor $R_2$, across which a voltage proportional to the charging current appears, is connected in series with the seconeary winding $n_2$. Via an integrator 56 and an attenuator 55 this voltage is applied to the inverting input of a second control amplifier 60, whose non-inverting input receives the reference voltage from the voltage source 30. The output of the control amplifier 60 is coupled to the input 12 of the pulse-width modulator by a switch $S_3$. The output voltage of the control amplifier 60 is integrated by the capacitor $C_1$ and is subsequently applied to the input 12 of the pulse-width modulator 10 as a first feedback voltage. The voltage across the resistor $R_1$ is also applied to this input 12 via the capacitor $C_1$ as a second feedback voltage. In response to these voltages the modulator 10 controls the width of the control pulses for the transistor $T_1$ in such a way that the average charging current is substantially equal to a desired value. By means of a switch $S_2$ a motor M can be connected in parallel with the battery 6. When the switch $S_2$ is closed the arrangement delivers the supply voltage for the motor M. Simultaneously with the closure of the switch $S_2$ the input 12 of the pulse-width modulator 10 is coupled to the output of the first control amplifier 40 by the switch $S_3$. The voltage across the motor M is then maintained substantially constant in the same way as is described with reference to FIG. 1. Obviously, it is also possible to construct the arrangement of FIG. 5 with the emitter of the transistor $T_1$ connected to ground, as is shown in FIG. 3.

Figure 6:
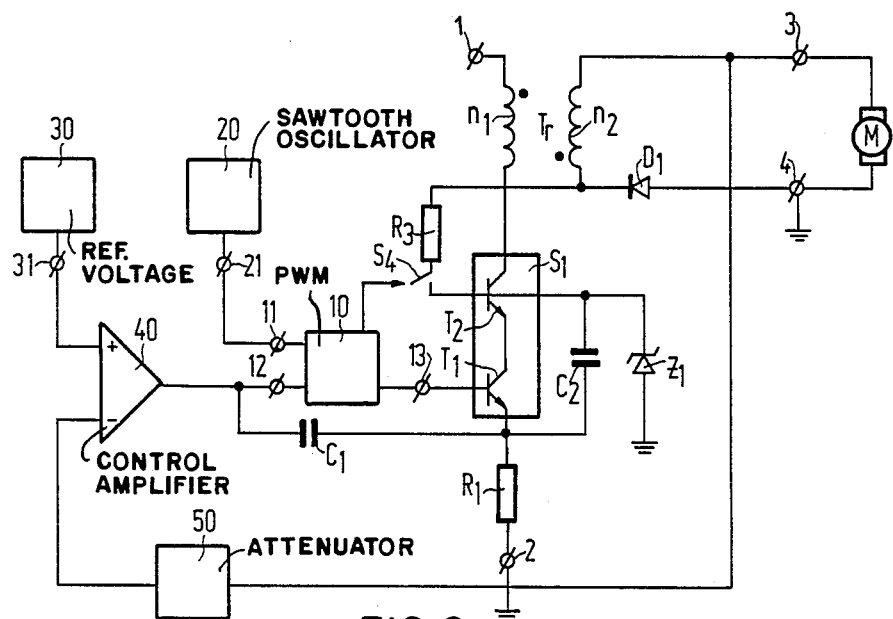
FIG. 6 shows a fourth embodiment of a power-supply arrangement in accordance with the invention.

FIG. 6 shows a fourth embodiment of a power-supply arrangement in accordance with the invention, identical parts bearing the same reference numerals as in FIG. 1. In this embodiment the transistor switch $S_1$ comprises the series arrangement of a high-voltage transistor $T_2$, which can be turned off comparatively slowly, and a low-voltage transistor $T_1$, which can be turned off comparatively fast. A capacitor $C_2$ is arranged between the base of the transistor $T_2$ and the emitter of the transistor $T_1$. Further, the base is coupled to ground by a Zener diode $Z_1$ and, via the series arrangement of a switch $S_4$ and a resistor $R_3$, to that end of the secondary winding $n_2$ which is positive during the forward interval. It is to be noted that the resistor $R_3$ may be replaced by a current source. The switch $S_4$ is opened and closed by means of pulses which are derived from the pulse-width modulator 10 and which have the same width as the control pulses for the transistor $T_1$.

Upon termination of a control pulse the transistor $T_1$ is turned off and the switch $S_4$ is opened. The charge stored in the collector-base capacitance of the transistor $T_2$ and the space charge then flow into the capacitor $C_2$, the voltage across this capacitor being limited by the zener diode $Z_1$. This ensures that the transistor $T_2$ is turned off rapidly. Upon the start of a subsequent pulse the base current for the transistor $T_2$ is supplied by the capacitor $C_2$, which is discharged via the base-emitter of the transistor $T_2$ and the collector-emitter of the transistor $T_1$. This ensures that the transistor $T_2$ is turned on rapidly. The base current for the transistor $T_2$ is derived from the positive voltage across the secondary $n_2$ via the resistor $R_3$ and the switch $S_4$, which is now closed. Otherwise, the arrangement operates in the same way as that shown in FIG. 1.

The invention is not limited to the embodiments shown. Within the scope of the invention many variants are conceivable to those skilled in the art. For example, instead of by means of a capacitor, the voltage across the resistor $R_1$ may be applied to the second input of the pulse-width modulator in other ways.

In the embodiments described herein the power-supply arrangement is each time constructed as a flyback converter. However, by reversing the polarity of the diode $D_1$ the arrangement may also be constructed as a forward converter. Moreover, the transistor switch $S_1$ may be constructed in a manner other than as shown. The attenuators shown in the embodiments are not necessary in all cases and may then be dispensed with. Furthermore, the load on the power-supply arrangement may be constituted by other kinds of load. If the load is constituted by a motor, a capacitor may be arranged in parallel with the motor in the embodiments shown.

What is claimed is:

1. A power-supply arrangement comprising:
   a series arrangement of at least a primary winding of a transformer, a transistor switch and a first resistor connected between a first and a second input terminal for receiving an input voltage,
   a series arrangement of at least a secondary winding of the transformer and a diode, coupled between a first and a second output terminal for connection to a load,
   a pulse-width modulator for supplying control pulses to the transistor switch,
   an oscillator for supplying a sawtooth signal to a first input of the pulse-width modulator, and
   a control amplifier for supplying to a second input of the pulse-width modulator a first feedback signal which is a measure of the difference between a reference signal and a signal which is proportional to an output signal of the power-supply arrangement, and means for applying to the second input of the pulse-width modulator a second feedback signal which is a measure of the voltage across the first resistor.

2. A power supply-arrangement as claimed in claim 1, characterized in that said applying means comprise a capacitor having a first output terminal coupled to the second input of the pulse-width modulator and a second terminal coupled to one end of the first resistor.

3. A power supply arrangement as claimed in claim 2, characterized in that
   the oscillator is adapted to supply a negative-ramp sawtooth signal,
   an end of the first resistor which is connected to the second input terminal is connected to a point at ground potential, and
   the second terminal of the capacitor is coupled to that end of the first resistor which is not connected to the second input terminal.

4. A power-supply arrangement as claimed in claim 2, characterized in that
   the oscillator is adapted to supply a positive-ramp sawtooth signal,
   an end of the first resistor which is not connected to the second input terminal is connected to a point at ground potential, and
   the second terminal of the capacitor is coupled to that end of the first resistor which is connected to the second input terminal.

5. A power-supply arrangement as claimed in claim 1, characterized in that the load comprises a motor and the output signal of the power-supply arrangement comprises a voltage for energizing the motor.

6. A power-supply arrangement as claimed in claim 1, characterized in that the load comprises a rechargeable battery and the output signal of the power-supply arrangement comprises a current for charging the battery.

7. A power supply arrangement as claimed in claim 6, further comprising a switch for selectively coupling a motor in parallel with the battery, and wherein in the parallel-connected condition of the battery and motor the output signal of the power-supply arrangement comprises a voltage for energizing the motor.

8. A power-supply arrangement as claimed in claim 2, characterized in that the load comprises a motor and the output signal of the power-supply arrangement comprises a voltage for energizing the motor.

9. A power-supply arrangement as claimed in claim 2 characterized in that the load comprises a rechargeable battery and the output signal of the power-supply arrangement comprises a current for charging the battery.

10. A power-supply arrangement as claimed in claim 1 wherein the load includes a rechargeable battery connected to the output terminals, a motor and a switch for selectively coupling the motor in parallel with the battery, and wherein
    when the motor is connected in parallel with the battery, said first feedback signal supplied by said control amplifier is a measure of the difference between said reference signal and said output signal which is then proportional to motor voltage, and
    a second control amplifier for supplying to said second input of the pulse width modulator a feedback signal which is a measure of the difference between a reference signal and a signal which is proportional to the average charging current of the battery when said switch decouples the motor from the battery.

11. A switching power-supply comprising:
    first and second input terminals for connection to a source of supply voltage,
    a transformer having a primary winding and a secondary winding,
    a controlled semiconductor switch,
    a current-sensing resistor,
    means connecting said primary winding, said semiconductor switch and said resistor in a first series circuit across said input terminals so that the resistor develops a voltage determined by current in the primary winding,
    first and second output terminals for connection to a load,
    means coupling a diode and said secondary winding in a second series circuit to said output terminals,
    a pulse width modulator having first and second inputs and an output for supplying control pulses to a control electrode of the semiconductor switch,
    a sawtooth oscillator supplying a sawtooth signal independent of load to the first input of the pulse width modulator,
    a source of reference signal indicative of a desired output voltage at the output terminals,
    a control amplifier having a first input coupled to an output of said reference signal source and a second input coupled to receive a signal proportional to output voltage or current of the power supply, said control amplifier having an output for supplying a first feedback signal which is a measure of the difference between the signals at its first and second inputs, and
    means for additively combining and supplying to the second input of the pulse width modulator said first feedback signal and a second feedback signal which is a measure of the voltage developed across said resistor.

12. A power-supply as claimed in claim 11 wherein said combining and supplying means includes a capacitor coupled between said resistor and said second input of the pulse width modulator.

13. A power-supply as claimed in claim 12 wherein said capacitor and resistor are coupled in series between the second input of the pulse width modulator and a point of reference potential whereby said capacitor and resistor further function as a low-pass filter to bypass high-frequency variations of the first feedback signal away from the second input of the pulse width modulator.

14. A power-supply as claimed in claim 11 wherein said semiconductor switch comprises a low-voltage transistor having a base, an emitter and a collector, said power supply further comprising a high-voltage switching transistor having a base, an emitter and a collector, said high voltage switching transistor being connected in series with the low-voltage transistor, the primary winding and the current-sensing resistor in said first series circuit, a capacitor coupling said base of the high-voltage transistor to a point in the first series circuit whereby a capacitor discharge path is formed that includes the base-emitter circuit of the high-voltage transistor and the collector-emitter circuit of the low-voltage transistor, and switching means for periodically coupling said transformer secondary winding to the base of the high-voltage transistor, and wherein the output terminals are intended for connection to a load that comprises a motor.

15. A power-supply as claimed in claim 11 wherein the load includes a rechargeable battery connected to the output terminals, a motor and a switch for selectively coupling the motor in parallel with the battery, means for deriving a control voltage proportional to the battery average charge current, a second control amplifier having a first input coupled to said output of the reference signal source and a second input coupled to receive said proportional control voltage, said second control amplifier having an output for supplying a further feedback signal which is a measure of the difference between the reference signal and said control voltage, and a second switch operable in synchronism with the first switch for selectively coupling the second input of the pulse width modulator to the outputs of the first and second control amplifiers, said second switch coupling the output of the second control amplifier to the second input of the pulse width modulator when the first switch is open and coupling the output of the first control amplifier to the second input of the pulse width modulator when the first switch is closed.

16. An electric shaver comprising: a motor, a power-supply arrangement comprising: a series arrangement of at least a primary winding of a transformer, a transistor switch and a first resistor connected between a first and second input terminal for receiving an input voltage, a series arrangement of at least a secondary winding of the transformer and a diode coupled between a first and a second output terminal for connection to a load, a pulse width modulator for supplying control pulses to the transistor switch, an oscillator for supplying a sawtooth signal to a first input of the pulse-width modulator, and a control amplifier for supplying to a second input of the pulse-width modulator a first feedback signal and a signal which is a measure of the difference between a reference signal which is proportional to an output signal of the power-supply arrangement, and means for applying to the second input of the pulse-width modulator a second feedback signal which is a measure of the voltage across the first resistor, and means coupling said motor to said output terminals of the power-supply arrangement.

* * * * *